United States Patent Office 3,689,348
Patented Sept. 5, 1972

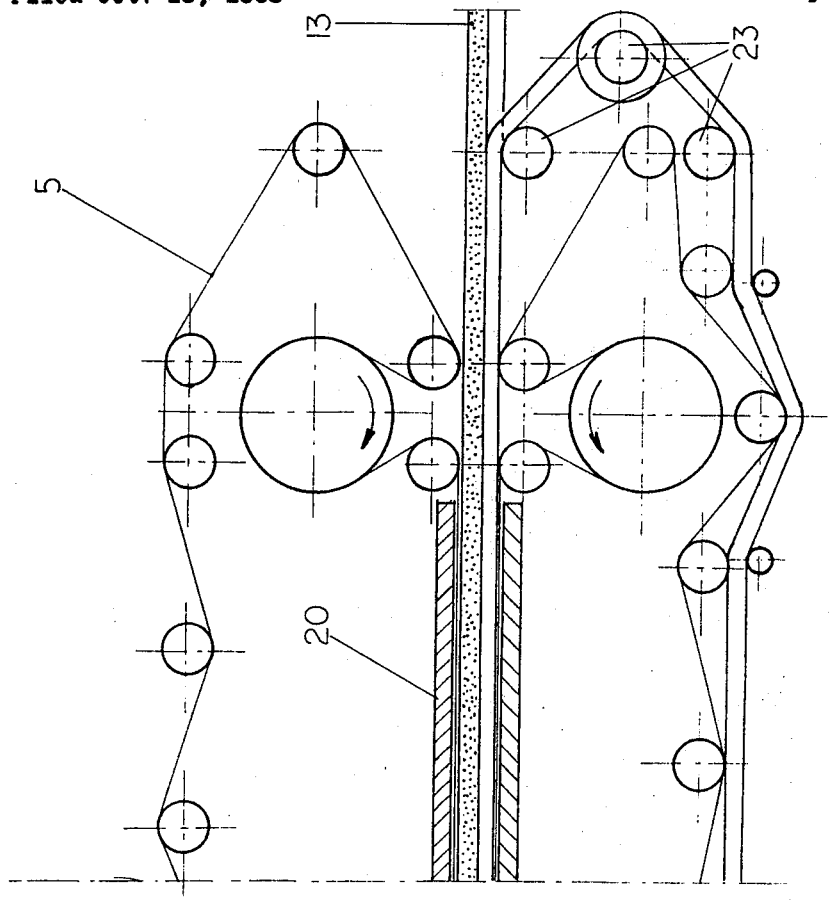
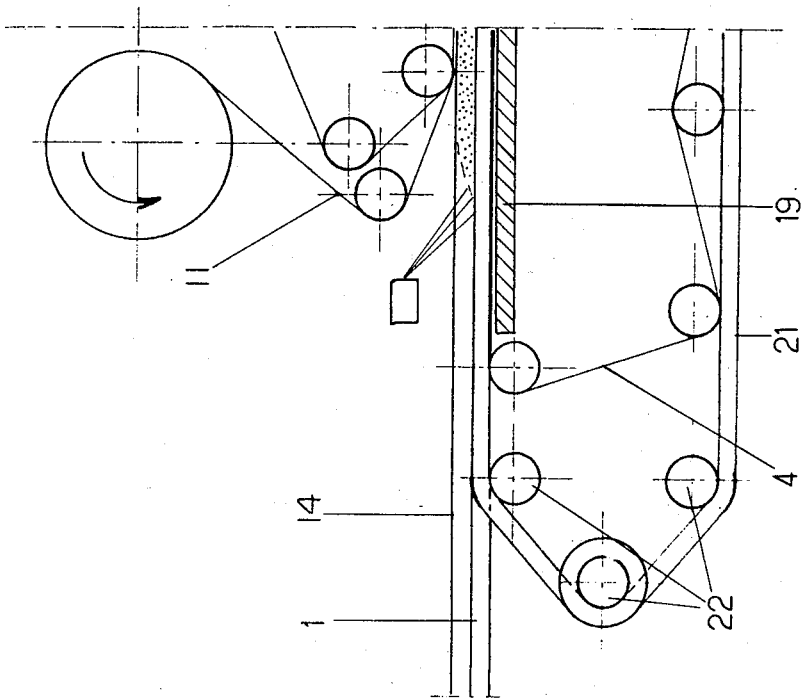
Fig. 6

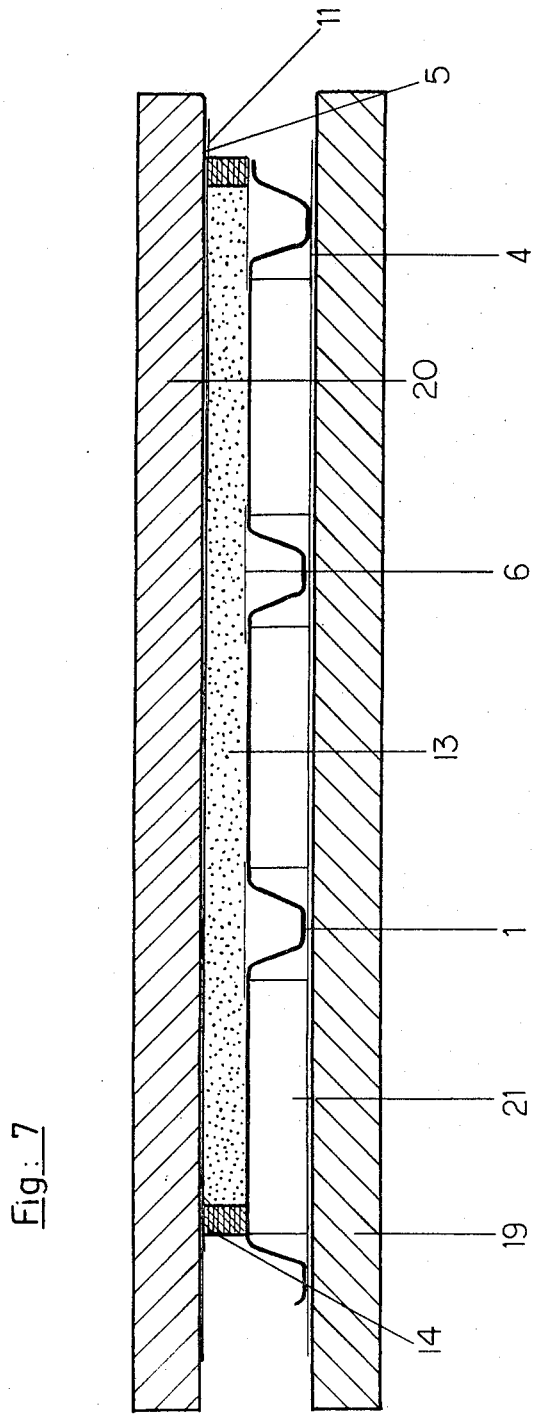

3,689,348
PROCESS FOR CONTINUOUS PRODUCTION OF COMPOSITE PLATES WHOSE FACES CAN BE GIVEN A PROFILE OR A FIXED IMPRESSION
Jean Marie Raymond Albert Peille, 60 Rue E. Sermet, Esperaza Aude, France
Filed Oct. 18, 1968, Ser. No. 768,624
Int. Cl. B32b *31/08*
U.S. Cl. 156—292
2 Claims

ABSTRACT OF THE DISCLOSURE

The present invention relates to a process and device for continuous production of composite plates specifically made of a core of expanded material and two facings that can be given a profile or fixed impression.

---

The continuous production of plates of expanded material is well known. Most frequently, the product for expansion is poured in a liquid state onto a support sheet or plate which is generally one of the facings of the composite plate conveyed by a traversing movement. The product for expansion is then covered with a sheet or plate which generally forms the second facing unrolled or engaged in a parallel direction and at the same speed as the support sheet.

During expansion, the assembly thus formed penetrates into a shaping and transporting device where shaping and polymerization of the composite plates takes place and which can then be cut up.

In known processes, the liquid reagent is deposited on a support sheet or plate forming one of the facings of the composite plate, by means of a spray flow device.

This support sheet or plate can be either flat or with a profile or fixed impression. In this case, it has hollow parts. The liquid reagent then flows into the hollow parts and after expansion the plate has a dented surface making the deposit of the sheet or, plate forming the second facing, extremely difficult, specifically involving the inclusion of cavities filled with air and forming excrescences.

It is also known to deposit the liquid reagent on a support sheet or plate forming one of the facings of the composite plate, this sheet or plate having a flat surface. Expansion then occurs in a regular manner.

The applying of the second facing which has hollow parts is extremely difficult to carry out on the surface of the expanded material, which is flat.

Composite plates which have the best characteristics are obtained by means of a uniform expansion made perpendicularly to the support sheets or plates forming the facings. This result cannot be obtained owing to the difficulties stated above.

The present invention has the object of providing a process and machine enabling a composite plate to be obtained of which one or both faces can have a profile or fixed impression, such as ribs, corrugations or hammerings.

It also enables expansion to be obtained in identical conditions with those seen between two flat sheets or plates.

It was also ascertained—and it is this fact which is the object of the present invention—that a modification applied to a continuous production process of plates of expanded material enables a composite plate to be obtained of which one or both faces can have a profile or fixed impression. To secure this result, either a strip of the width of the facing, if the hollows are very close together, or several narrow strips if the hollows are spaced out, is glued or soldered onto the surface of the facing in contact with the expanded material.

This operation is carried out continuously. The strips can be of various materials, specifically of metal, stratified thermoplastics or paper, this list not being restrictive. In certain cases, the surface of the strip that come into contact with the expanded material must undergo suitable treatment to facilitate its adhering to the latter. For facilitating understanding, the process and machine are described by way of example with reference to the accompanying drawings, in which:

FIG. 6 shows diagrammatically another alternative of a machine comprising the necessary devices for carrying out the various stages of the process according to the invention;

FIG. 7 shows a cross section of the device enabling the avoiding of distortions of the surface of faces with a profile or fixed impression.

Figure 1:
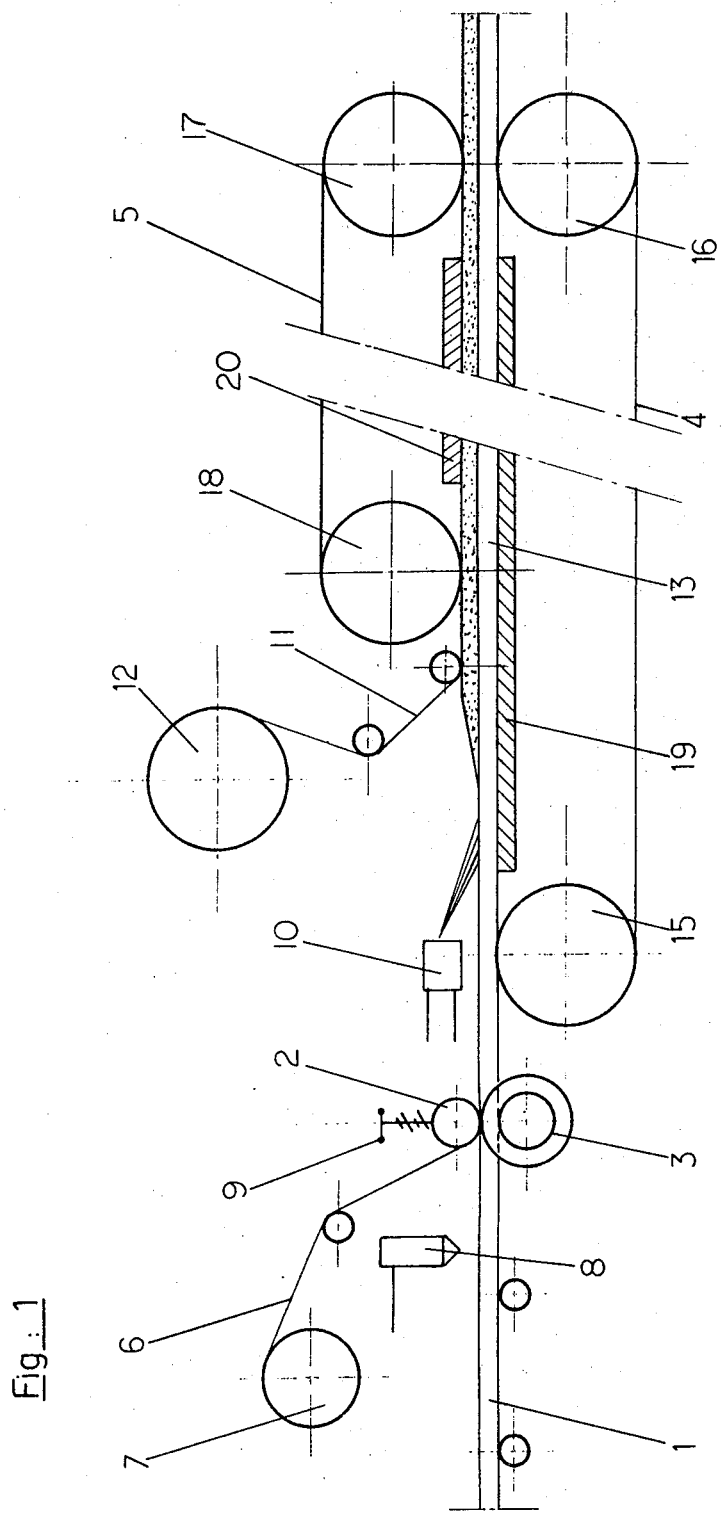
FIG. 1 shows diagrammatically, without a fixed scale, a machine comprising the necessary devices for carrying out the various stages of the process according to the invention.

In the machine shown in FIG. 1, a plate 1 with a given profile is engaged in the mechanical device composed of rollers 2 and 3. The rollers are synchronized with conveyor belts 4 and 5. The roller 3 comprises previously fixed impressions. The roller 2 can eventually be provided with a thremo-regulated device.

Figure 2:
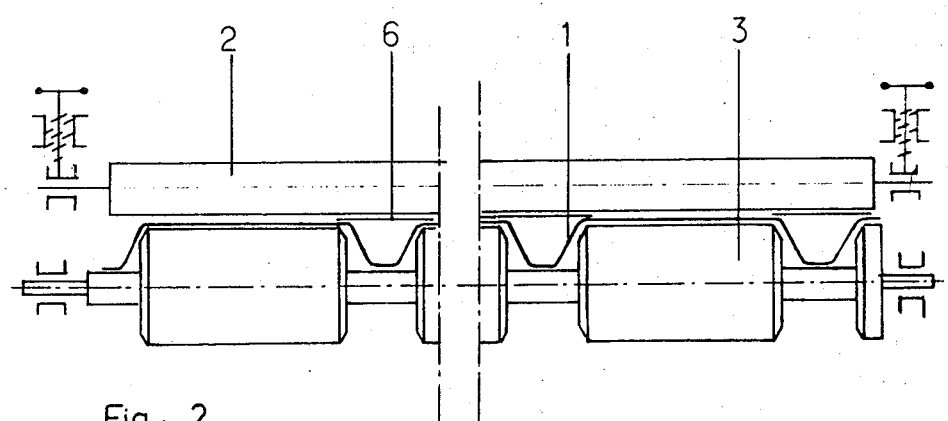
FIG. 2 is a cross section view of the device enabling the continuous fixing of strips on the facings of the composite plate.
Figure 3:
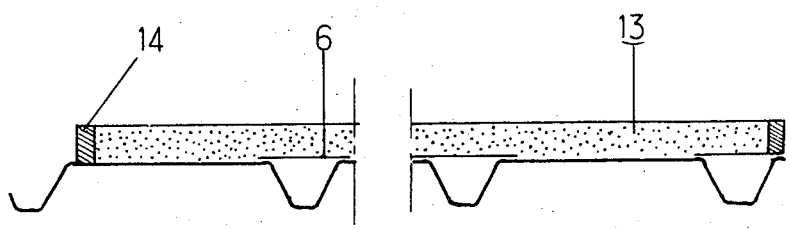
FIG. 3 shows a composite plate with a ribbed profile on one of its faces, the other facing being flat.
Figure 4:
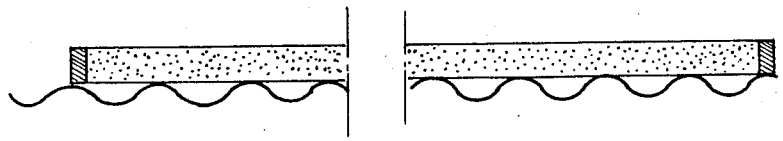
FIG. 4 shows a composite plate with a corrugated profile on one of its faces, the other facing being flat.
Figure 5:
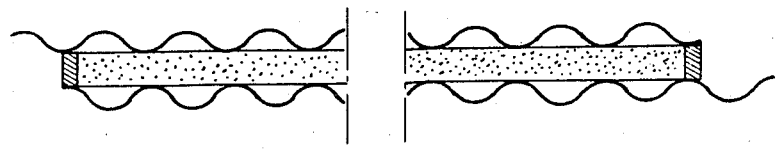
FIG. 5 shows a composite plate with two corrugated profile facings.

FIG. 2 shows in detail, in cross section, an example or embodiment of this device, one or more parallel film strips 6 being unrolled from one or a plurality of rollers, and applied to the plate 1 by means of the roller 2.

As is seen in FIG. 2, the profile of the illustrated plate 1 includes spaced longitudinally extending projections or ribs 1a, 1b and 1c, in the form of indentations or corrugations extending longitudinally with respect to the plate 1. The above-mentioned strips 6 are applied and secured to the plate 1 in positions wherein they cover the indentations 1a, 1b and 1c.

Eventually, by means of several adhesive distributors 8, thin films of adhesive can be deposited on the surface of the plate 1 with a given profile. The heating device with which the roller is fitted 2 enables adhesion of the adhesive to be speeded up. The pressure exerted by the roller 2 can be adjusted at will be means of bearings 9.

The liquid reagent can be deposited by means of a movable spraying device on the surface of the plate 1 with a given profile.

A sheet 11, which can eventually be of the same material as the plate 1 with a given profile, is unrolled from a roller 12.

Lateral sealing of the composite panel during expansion of the expanded material 13 can be ensured either by previously glueing a section 14, or by turning the strip 6 upwards in the vicinity of the edges of the plate 1 with a given profile.

The expanded material 13 faced with its facings 1 and 11 then goes into a shaping and calibrating device formed by the two conveyor belts 4 and 5 guided by drums 15, 16, 17 and 18. The requisite spacing between the belts 4 and 5 is previously regulated by a mechanical device keeping a given space between the plates 19 and 20. On emerging from this device, the composite plates are sawn up into various sizes.

The process according to the invention enables plates to be made that can be used in transport, building trade and the cold industry.

The introducing of a given profile having the effect of increasing appreciably the rigidity of the composite plates enables very large sized plates to be used and thus makes a saving in constructions costs of assemblies comprising such elements. Another saving is also afforded by the fact that the composite plate has its insulating material incorporated during its manufacture, and thus in an economical manner, whereas with conventional materials insulating material must be applied on the spot to given profile plates, the latter having been already fixed on the framework of the assembly that is to be produced.

According to an alternative method of carrying out the invention, to avoid distortions of the surface of faces having a given profile or impression, an endless belt is placed in the spaces between two ribs or corrugations, the thickness of this belt being slightly less than the depth of the rib or corrugation.

This endless belt must have such characteristics that its elasticity in the longitudinal direction ensures that it is properly guided on the drums placed at both ends of the machine. It must also have sufficient rigidity in a vertical direction to counteract the pressure exerted by the expanded material during its passage into the shaping and calibrating device. This result can be specifically obtained by means of belts whose external face comprises hollows to a given depth; a cellular material can also be used whose mechanical properties enable the above-mentioned result to be obtained.

In the machine shown in FIGS. 6 and 7, the plate 1 with a given profile or impression is engaged on the belt 4, three belts 21 are placed horizontally on the conveyor belt 4. The spacing between the belts 21 is so arranged that they fill the free space between the ribs of the plate 1, as shown in FIG. 7. The belts 21 are guided by a set of rollers 22 and 23. The entire machine, belts 21 and excepting their guiding and driving device, is identical with that previously described.

FIG. 7 shows a cross section of the composite plate as it appears during its passage in the shaping and calibrating device.

In this figure, reading from bottom to top, we see successively a calibration table 19, the bottom conveyor belt 4, the endless belts 21, the plate with a given profile or impression 1, the expanded material 13 laterally limited by a section 14, the top facing 11, the top conveyor belt 5, the calibration table 20.

What I claim is:

1. A process for continuously producing composite plates having an outer face comprised of a rigid facing provided with a series of grooves forming longitudinal indentations, said process comprising the steps of:
    linearly and continuously moving said rigid facing, said rigid facing forming a first outer facing of the composite plate;
    unwinding a covering strip over said grooves forming longitudinal indentations in said rigid facing and gluing said covering strip to crests on each side of the grooves forming the longitudinal indentations in said rigid facing in order to form a plane surface;
    depositing on said plane surface an expansible polymeric liquid reagent, said expansible polymeric liquid reagent adhering to said plane surface;
    unwinding a second continuous strip and applying it by means of pressure to said expansible polymeric liquid reagent while said expansible polymeric liquid reagent is expanding, said expansible polymeric liquid reagent adhering to said second continuous strip, said second continuous strip forming a second outer facing of the composite plates; and
    applying a continuous pressure to the outer surfaces of said first and second outer facings in order to form composite plates of a predetermined thickness.

2. A process in accordance with claim 1 including the step of applying to the longitudinal edges of said rigid facing a retainer means for laterally holding said expansible polymeric liquid reagent during expansion.

References Cited

UNITED STATES PATENTS

| | | | |
|---|---|---|---|
| 2,648,619 | 8/1953 | Alderfer | 156—78 X |
| 3,408,248 | 10/1968 | Maass | 156—79 X |
| 3,458,337 | 7/1969 | Rugg | 156—78 X |
| 2,744,624 | 5/1956 | Hoogstoel et al. | 156—208 |
| 2,915,426 | 12/1959 | Poelman | 156—206 X |
| 3,200,026 | 8/1965 | Brown | 156—196 X |

CARL D. QUARFORTH, Primary Examiner

P. A. NELSON, Assistant Examiner

U.S. Cl. X.R.

156—79, 83, 205, 210

UNITED STATES PATENT OFFICE
CERTIFICATE OF CORRECTION

Patent No. 3,689,348            Dated September 5, 1972

Inventor(s) Jean Marie Raymond Albert Peille

It is certified that error appears in the above-identified patent and that said Letters Patent are hereby corrected as shown below:

In the heading above the Abstract of the Disclosure, insert --Claims priority, applications, France, patent application 883 filed November 7, 1967 and application of addition 884 filed December 7, 1967.--

Signed and sealed this 23rd day of January 1973.

(SEAL)
Attest:

EDWARD M. FLETCHER, JR.            ROBERT GOTTSCHALK
Attesting Officer                   Commissioner of Patents